US006701460B1

(12) United States Patent
Suwandi et al.

(10) Patent No.: US 6,701,460 B1
(45) Date of Patent: Mar. 2, 2004

(54) METHOD AND APPARATUS FOR TESTING A COMPUTER SYSTEM THROUGH SOFTWARE FAULT INJECTION

(75) Inventors: Jongki A. L. Suwandi, San Jose, CA (US); Madhusudhan Talluri, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 546 days.

(21) Appl. No.: 09/684,598

(22) Filed: Oct. 5, 2000

Related U.S. Application Data

(60) Provisional application No. 60/160,996, filed on Oct. 21, 1999.

(51) Int. Cl.[7] .............................. G06F 11/00; G06F 9/44
(52) U.S. Cl. .......................... 714/41; 714/38; 717/124; 717/127; 717/131
(58) Field of Search .............. 714/38, 41; 717/124–131

(56) References Cited

U.S. PATENT DOCUMENTS

| | | | | |
|---|---|---|---|---|
| 5,265,254 A | * | 11/1993 | Blasciak et al. | 717/130 |
| 5,450,586 A | * | 9/1995 | Kuzara et al. | 717/124 |
| 5,812,828 A | * | 9/1998 | Kaufer et al. | 703/22 |
| 6,139,198 A | * | 10/2000 | Danforth et al. | 717/128 |
| 6,282,701 B1 | * | 8/2001 | Wygodny et al. | 717/125 |
| 6,484,276 B1 | * | 11/2002 | Singh et al. | 714/41 |
| 6,490,721 B1 | * | 12/2002 | Gorshkov et al. | 717/130 |

OTHER PUBLICATIONS

Microsoft Computer Dictionary, Microsoft Press, 1997, 3rd Edition, p. 251.*

Fault Injection Mechanism, Oct. 1998, Research Disclosure, Vol 41 Issue 414.*

Publication, entitled "Software Fault Injection and its Application in Distributed Systems," by Harold A. Rosenberg, et al., IEEE, Jun. 1993, pp. 208–217.

Publication, entitled "FINE: A Fault Injection and Monitoring Environment for Tracing the UNIX System Behavior under Faults," by Wei–lun Kao, et al., IEEE Transactions on Software Engineering, Nov. 1993, No. 11, New York, US.

Publication, entitled "DEFINE: A Distributed Fault Injection and Monitoring Environment," by Wei–lun Kao, et al., IEEE 1995, pp. 252–259.

Publication, entitled "Fault–Injection–Based Testing of Fault–Tolerant Algorithms in Message–Passing Parallel Computers," by Douglas M. Bough, et al., IEEE, Jun. 24, 1997, pp. 258–267.

* cited by examiner

*Primary Examiner*—Robert Beausoliel
*Assistant Examiner*—Emerson Puente
(74) *Attorney, Agent, or Firm*—Park, Vaughan & Fleming LLP

(57) ABSTRACT

One embodiment of the present invention provides a system for testing a computer system by using software to inject faults into the computer system while the computer system is operating. This system operates by allowing a programmer to include a fault point into source code for a program. This fault point causes a fault to occur if a trigger associated with the fault point is set and if an execution path of the program passes through the fault point. The system allows this source code to be compiled into executable code. Next, the system allows the computer system to be tested. This testing involves setting the trigger for the fault point, and then executing the executable code, so that the fault occurs if the execution path passes through the fault point. This testing also involves examining the result of the execution. In one embodiment of the present invention, if the fault point is encountered while executing the executable code, the system executes the fault point by: looking up a trigger associated with the fault point; determining whether the trigger has been set; and executing code associated with the fault point if the trigger has been set.

21 Claims, 6 Drawing Sheets

US 6,701,460 B1

METHOD AND APPARATUS FOR TESTING A COMPUTER SYSTEM THROUGH SOFTWARE FAULT INJECTION

RELATED APPLICATION

This application hereby claims priority under 35 U.S.C. §119 to U.S. Provisional Patent Application No. 60/160,996 filed on Oct. 21, 1999, entitled "Fault Injection Method For Multi-Node Clusters."

BACKGROUND

1. Field of the Invention

The present invention relates to mechanisms for testing computer systems. More specifically, the present invention relates to a method and an apparatus for testing a computing system by injecting faults into the computer system while the computer system is running.

2. Related Art

The need for reliable computing systems has lead to the development of "highly available" computer systems that continue to function when one or more of the subsystems and/or components of a computing system fail.

In order to ensure that highly available computer systems operate properly, it is necessary to perform rigorous testing. This testing is complicated by the fact that highly available computer systems typically include a large number of components and subsystems that are subject to failure. Furthermore, an operating system for a highly available computer system contains a large number of pathways to handle error conditions that must also be tested.

Some types of testing can be performed manually, for example by unplugging a computer system component, disconnecting a cable, or by pulling out a computer system board while the computer system is running. However, an outcome of this type of manual testing is typically not repeatable and is imprecise because the manual event can happen at random points in the execution path of a program and/or operating system that is executing on the highly available computer system.

What is needed is a method and an apparatus that facilitates testing a computer system by injecting faults at precise locations in the execution path of an operating system and/or program that is executing on a computer system.

SUMMARY

One embodiment of the present invention provides a system for testing a computer system by using software to inject faults into the computer system while the computer system is operating. This system operates by allowing a programmer to include a fault point into source code for a program. This fault point causes a fault to occur if a trigger associated with the fault point is set and if an execution path of the program passes through the fault point. The system allows this source code to be compiled into executable code. Next, the system allows the computer system to be tested. This testing involves setting the trigger for the fault point, and then executing the executable code, so that the fault occurs if the execution path passes through the fault point. This testing also involves examining the result of the execution.

In one embodiment of the present invention, if the fault point is encountered while executing the executable code, the system executes the fault point by: looking up a trigger associated with the fault point; determining whether the trigger has been set; and executing code associated with the fault point if the trigger has been set.

In one embodiment of the present invention, the fault point calls a fault function that causes the fault to occur.

In one embodiment of the present invention, the fault point includes code that causes the fault to occur.

In one embodiment of the present invention, the trigger has global scope and is stored in a kernel address space of an operating system within the computer system.

In one embodiment of the present invention, the trigger is stored in an environment variable associated a method invocation.

In one embodiment of the present invention, the trigger is stored within an object reference. In a variation on this embodiment, the trigger causes the fault to be generated when the referenced object is invoked.

In one embodiment of the present invention, the fault can include: a computer system reboot operation, a computer system panic operation, a return of an error code, a forced change in control flow, a resource allocation failure, a response delay, and a deadlock.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing System

Figure 1:
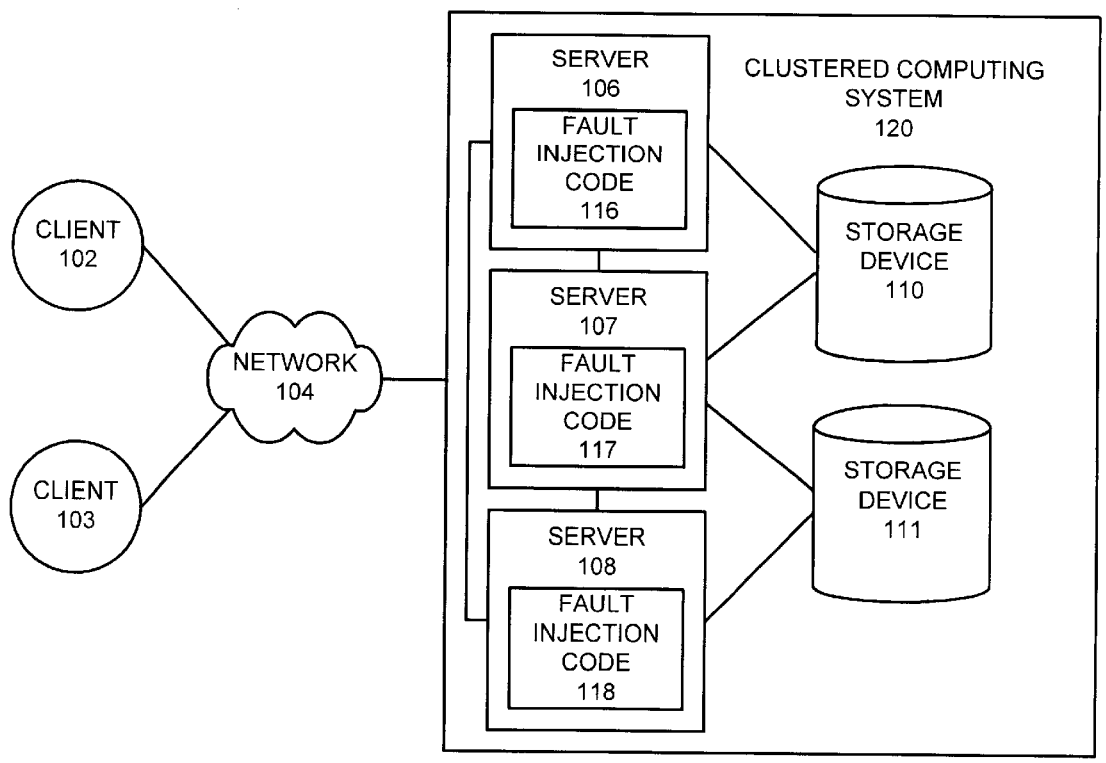
FIG. 1 illustrates a clustered computing system in accordance with an embodiment of the present invention.

FIG. 1 illustrates a clustered computing system 120 in accordance with an embodiment of the present invention. Clustered computer system 120 is coupled to client computing systems 102 and 103 through network 104.

Network 104 can include any type of wire or wireless communication channel capable of coupling together computing nodes. This includes, but is not limited to, a local area network, a wide area network, or a combination of networks. In one embodiment of the present invention, network 104 includes the Internet.

Clients 102–103 can include any node on network 104, including computational capability and including a mechanism for communicating across network 104.

Clients 102–103 communicate with clustered computing system 120 by sending packets to clustered computing system 120 in order to request services from clustered computing system 120.

Clustered computing system 120 includes a set of nodes that are coupled together through a communication channel (not shown). These nodes include servers 106–108.

Servers 106–108 can include any nodes with a mechanism for servicing requests from clients 102–103 for computational and/or data storage resources.

Clustered computing system 120 also includes storage devices 110–111. Storage device 110 is coupled to servers 106–107, and storage device 111 is coupled servers 107–108. Storage devices 110–111 provide archival storage for code and/or data that is manipulated by servers 106–108. This archival storage may include, but is not limited to, magnetic storage, flash memory, ROM, EPROM, EEPROM, and battery-backed-up RAM.

In order to test clustered computing system 120, servers 106–108 include fault injection code 116–118, which is described in more detail below with reference to FIGS. 2–15.

Figure 2:
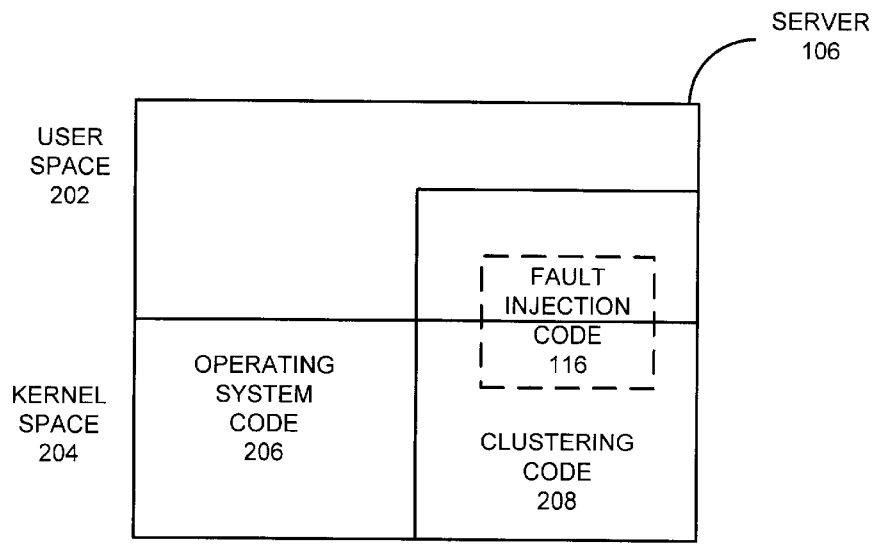
FIG. 2 illustrates some of the software within a computer system in accordance with an embodiment of the present invention.

FIG. 2 illustrates some of the software within server 106 from FIG. 1 in accordance with an embodiment of the present invention. Software within server 106 resides in either user space 202 or kernel space 204. User space 202 is generally reserved for code within application programs that are executed by a user. Kernel space 204 is generally reserved for operating system code.

Operating system code 206 resides within kernel space 204. In one embodiment of the present invention, the operating code 206 implements the Solaris operating system, which is distributed by Sun Microsystems, Inc. of Palo Alto, Calif. The Solaris operating system is a UNIX-based operating system. Hence, in describing the present technology, UNIX terminology and concepts are frequently used. However, this usage is for purposes of illustration and is not to be construed as limiting the invention to this particular operating system.

Clustering code 208 performs clustering functions that enable servers 106–108 to work together in performing computations, and to distribute computational workload between servers 106–108. Note that portions of clustering code 208 reside within kernel space 204 and other portions of clustering code 208 reside within user space 202.

Fault injection code 116 resides within clustering code 208. Note that a portion of fault injection code 116 resides within kernel space 204, and another portion resides within user space 202.

Testing Process

Figure 3:
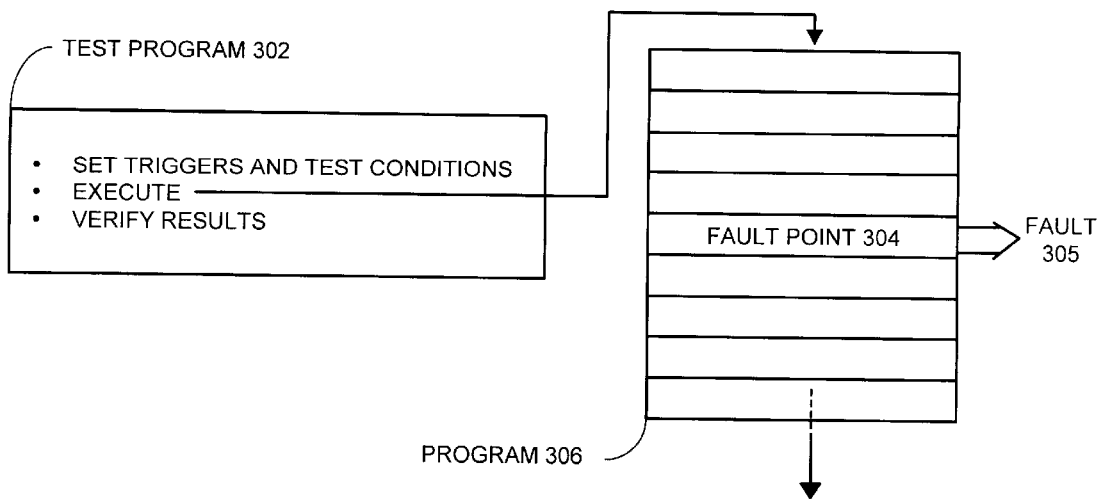
FIG. 3 illustrates the testing process in accordance with an embodiment of the present invention.

FIG. 3 illustrates the testing process in accordance with an embodiment of the present invention. This testing process is carried out by a test program 302, which sets triggers for faults and sets test conditions before executing a program 306. Note that program 306 can generally include any type of application program. However, in one embodiment of the present invention, program 306 is an operating system that is tested to ensure reliability.

If a fault point 304 is executed during execution of program 306, and a trigger for fault point 304 has been set, fault point 304 causes a fault 305 to be generated. Note that fault 305 can generally include any type of fault or other event that can be triggered through software. This includes, but is not limited to, a computer system reboot operation, a computer system panic operation (that causes operation of a computer system to terminate), a return of an error code, a forced change in control flow, a resource (memory) allocation failure, a response delay, an erroneous message and a deadlock.

Figure 4:
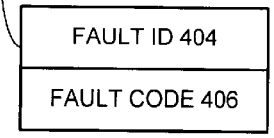
FIG. 4 illustrates a fault point in accordance with an embodiment of the present invention.

FIG. 4 illustrates a fault point 304 in accordance with an embodiment of the present invention. Fault point 304 includes a fault ID 404 which identifies a fault point 304. Fault point 304 also includes fault code 406, which causes the fault 305 to occur. Note that in general any type of code that causes an event within a computer system to occur can be used for fault code 406.

Fault code 406 can call a function that causes fault 305 to occur. Alternatively, fault code 406 can include code that is not within a function in order to modify variables in the local context of fault point 304.

Figure 5:
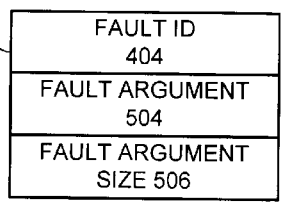
FIG. 5 illustrates a trigger in accordance with an embodiment of the present invention.
Figure 6:
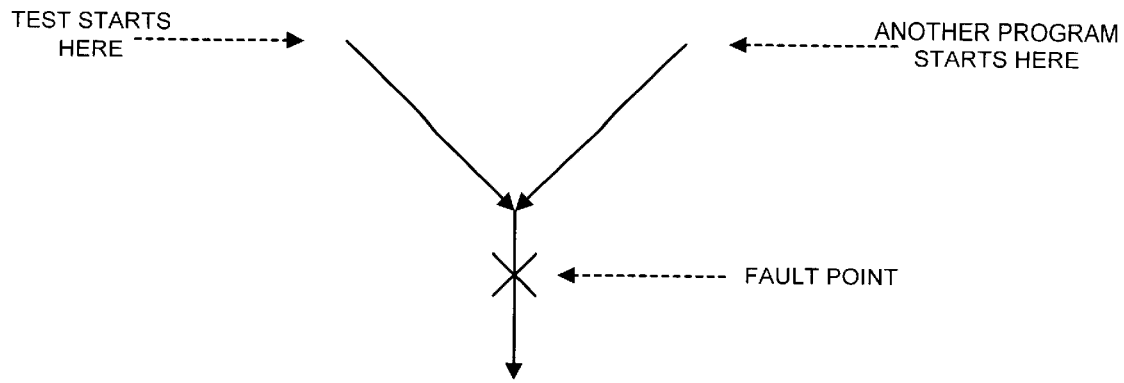
FIG. 6 illustrates the location of a fault point in accordance with an embodiment of the present invention.

FIG. 5 illustrates a trigger 502 in accordance with an embodiment of the present invention. Trigger 502 also includes fault ID 404, and additionally includes a fault argument 504, which enables data to be passed into fault point 304. For example, fault argument 504 may specify a delay time or an error code to return. Trigger 502 additionally includes a fault argument size 506.

Figure 15:
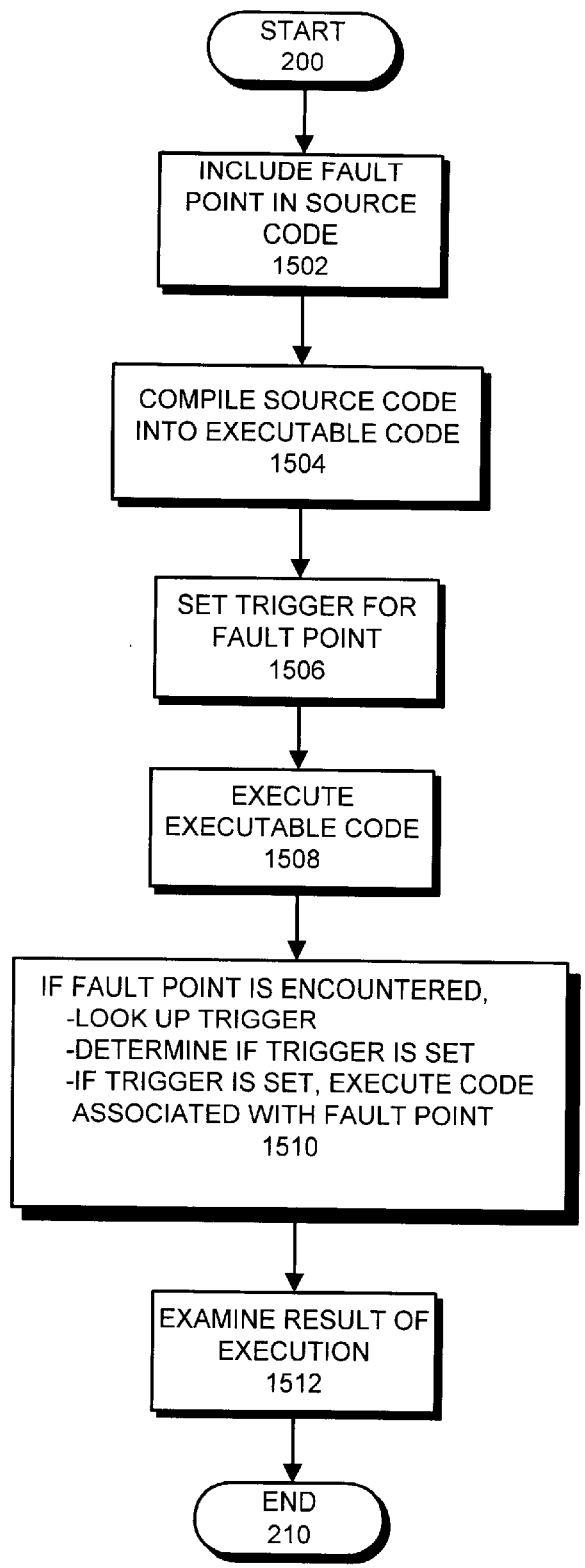
FIG. 15 is a flow chart illustrating the testing process in accordance with an embodiment of the present invention.

FIG. 15 is a flow chart illustrating the testing process in accordance with an embodiment of the present invention. The system starts by allowing a programmer to include at least one fault point 304 into source code for program 306 (step 1502). Next, the system allows this source code to be compiled into executable code for program 306 (step 1504).

During a subsequent testing phase, test program 302 sets a trigger 502 for fault point 304 within program 306 (step 1506). This causes fault point 304 to generate fault 305 if fault point 304 is executed during execution of program 306.

Next, the system allows the executable code for program 306 to be executed (step 1508). If fault point 304 is executed during this execution, the system looks up the corresponding trigger 502 for fault point 304, and then determines if trigger 502 is set. If so, the system executes fault code 406, which causes fault 305 to occur (step 1510).

Next, the system examines to result of the execution in order to determine the outcome of the testing (step 1512).

Fault Points

In one embodiment of the present invention, two conditions must be satisfied before a fault point code is executed (and thus generates a fault): the current execution path passes through it, and a trigger exists for its fault number. A fault point is said to be "triggered" when it gets executed.

In one embodiment of the present invention, this system supports four trigger types. There are a number reasons for providing multiple types. First, it is desirable for the system to support different testing needs.

Second, in some clustered computing systems, objects provide services. Clients request an object's service by first obtaining a reference to the object and then invoking the object's method implementing that service. Different objects providing different services may reside on different nodes of the cluster.

Most objects can carry out a service request by themselves and return the results of the service to the requesting clients right away. Some, however, require the services of other objects to complete a request. This implies a nested invocation behavior/scenario; that is, one invocation causing a chain of other invocations. For example, client A invokes object B's method which, in turn, must invoke object C's and object D's methods to complete client A's request.

This is further complicated by the ability to pass object references to a method as invocation arguments (very similar to passing pointers as function call arguments). These object references, in turn, can be used to invoke methods on the referenced objects. For example, suppose client A invokes object B's method with references to object C and object D as invocation arguments. Object B can now use these references to invoke objects C and D.

In one embodiment of the present invention, four trigger types are provided to support the above-described invocation scenarios. Depending on the invocation behavior of the component being tested, test programs (clients) can use one or more of the four trigger types to generate faults along the execution path(s) of one, some or all invocations in the scenario.

In one embodiment of the present invention, there are two ways to write fault points: using fault functions, and local fault points. Each is discussed below.

Fault Functions

Multiple fault points may generate the same fault. Instead of writing the same code for each fault point, it can be placed in a separate function, called a "fault function." The fault points can then be set up to call that function when triggered.

TABLE 1

```
void
foo::bar(Object_ptr objref, Environment& e)
{
    ...
#ifdef _FAULT_INJECTION
    FAULT_POINT(1329, objref, &e, do_delay);
#endif
    ...
}
```

In one embodiment of the present invention, a system provides a simple way to do this. For example, suppose there is a fault function, do_delay( ), which generates a delay fault, and suppose we want to set a fault point inside foo::bar( ) with fault number 1329 and which calls do_delay( ). This can be accomplished as illustrated in Table 1.

The call to FAULT_POINT( ) in Table 1 first checks if there is a trigger for fault number 1329 that is: (1) set globally, (2) set in the object reference making the current invocation, (3) set in the object reference passed in its second argument or (4) set in the environment variable whose address is passed in the third argument.

If there is such a trigger, FAULT_POINT( ) calls do_delay( ) with two arguments. The first is a pointer to the fault argument (a NULL pointer if there is no fault argument) carried by the trigger. The second is the size of the fault argument in bytes (zero if there is no fault argument). Otherwise, execution continues with the next instruction after FAULT_POINT( ).

Note, the second and third arguments to FAULT_POINT( ) are optional. If an object reference is unavailable to foo::bar( ), the second argument can be set to NULL. Similarly, if an environment variable is not accessible, or if the fault point is not meant to be triggered from an environment variable, the third argument can be set to NULL.

In one embodiment of the present invention, fault functions passed to FAULT_POINT( ) must be of type:

void (*)(void *fault_arg, size_t fault_argsize)

Fault arguments can be used to pass data to fault functions. Since a fault argument is an arbitrary sequence of bytes, it is up to the fault function how to interpret it. For instance, do_delay( ) can be passed the amount of time to delay. Another example is a fault function that sets an error code; the fault argument could be the error value to set. Yet another example is one that sends a message to a well-known service. In this case, the fault argument could be the message to send.

Local Fault Points

For some fault points it may be necessary include code within the scope of the code block that contains them (e.g. inside a function or loop body) because fault points need to, say, access a local variable or force a code block termination (e.g. return from a function or break from a loop). For example, fault point 137 below forces myfunc( ) to return with an error number. The value to return is passed as a fault argument.

TABLE 2

```
// myfunc( ): returns 0 if successful, an error number otherwise.
int
myfunc(Object_ptr objref, Environment *envp)
{
    ...
#ifdef _FAULT_INJECTION
    void         *fi_argp;
    size_t       argsize;
    if(FI::triggered(137, objref, envp, &fi_argp, &argsize)) {
        int    errnum = *((int *) fi_argp);
        return (errnum);
    }
#endif
    ...
    return (0);         // success
}
```

The function FI::triggered( ) first checks if there is a trigger set for fault number 137. If so, it sets fi_argp to point to the fault argument carried by the trigger, sets argsize to the size, in bytes, of the fault argument, and returns true. Otherwise, it sets fi_argp to NULL, sets argsize to zero, and returns false.

Note that a call to FAULT_POINT( ) (discussed previously), such as FAULT_POINT(1329, objref, &e, fault_func), can be rewritten using the local fault point method as

TABLE 3

```
void *argp;
size_t argsize;
if(FI::triggered(1329, objref, &e, &argp, &argsize)) {
    fault_func(argp, argsize);
}
```

In fact, this is how one embodiment of FAULT_POINT( ) is actually implemented: it calls FI::triggered( ) to check whether there is a trigger set for it and then calls the passed fault function. FAULT_POINT( ) is provided simply as a convenient routine to help writing fault points.

Triggers

A fault point gets executed when there is a trigger with a matching fault point. As described above, each trigger consists of three data items: a fault number, a fault argument and the fault argument size. These data items are said to be "carried" by the trigger.

Before a trigger can be used, it must be set. Typically, test programs set one or more triggers prior to invoking an object implementation's method or a system call. When a fault point along the invocation (execution) path matches one of the triggers, it gets executed (triggered) and generates a fault.

In one embodiment of the present invention, a fault injection system support four types triggers: global triggers, environment triggers, object reference triggers, and invocation triggers. There are a number reasons for providing multiple types of triggers, different testing needs and different invocation behaviors/scenarios. Most objects can carry out client requests by themselves. Invoking a method on these objects involves only one invocation (single-invocation scenario). Some objects, however, require the services of other objects before a request be completed.

Invoking a method on these objects causes a series of other invocations (nested-invocation scenario). Moreover, object references can be passed to an object as invocation arguments. These passed references can then be used to invoke methods on the referenced objects. Depending on the invocation behavior of the component being tested, test programs (clients) can use one, or more, of the trigger types to generate faults along the path(s) of one, some or all of the invocation.

The following sections further describe these trigger types. They also provide examples of how to set these triggers and invocation scenarios appropriate for each trigger type.

Global Triggers

Global triggers are triggers that are stored in kernel address space with global scope. They are accessible by all fault points throughout the system. Also, since global triggers are not associated with any particular invocation, they can be set for fault points outside the execution path of the current invocation; any event with execution path crossing those fault points can trigger them.

Note that global triggers are only global within a node, not throughout the entire cluster. "Cluster-wide" triggers can be simulated by setting the same global triggers in each node of the cluster.

Global triggers are particularly useful for testing features that are not part of a cluster but are affected by it, i.e. testing the side effects of a cluster. For example, global triggers can be used to test the behavior of the function stat( ) on a file when the owner node of the file crashes in the middle of the call. Since stat( ) is not part of the cluster, what is being tested here is not the cluster itself, but its effect on the system call. In this case, triggers for fault points along the execution path of the call can be set globally in the file's owner node prior to making the system call (see Table 4).

The fact that global triggers are invocation-independent makes them useful for "random" testing. This can be done, for example, by setting global triggers on a node at boot time for all fault points that can generate kernel panics. Any event that crosses one of these fault points will cause the node to crash. An external test program can be set up to watch for such crashes and when they occur to verify that the cluster as a whole still functions.

TABLE 4

```
int test1( )
{
    const ULong   nodeid = 2;        // node where triggers are
                                     // to be set/cleared
    int           fault_arg1374 = 3;
    char          *fault_arg965 = "abracadabra";
    struct stat   statbuf;
    ...
    /* Set triggers for fault points 1374 and 965 */
    fi_add(nodeid, 1374, &fault_arg1374, sizeof(fault_arg1374);
    fi_add(nodeid, 965, fault_arg965, strlen(fault_arg965)+1);
    /* Now test stat( ) */
    errno = 0;
    if (stat("/global/testnode1/pxfs_file" &statbuf) == 0) {
        printf("FAIL: stat( ) returned 0 instead of -1\n");
    } else if (errno != EXDEV) {
        printf("FAIL: stat( ) set errno %d instead of EXDEV\n",
            errno);
    } else {
        printf("PASS\n");
    }
    /* Clear triggers */
    fi_clear(nodeid, 1374);
    fi_clear(nodeid, 965);
}
```

However, the invocation-independent nature of global triggers also makes them inappropriate for certain testing needs. For example, let's suppose we have the code path that appears in FIG. 6.

What we would like to do is have the indicated fault point generate a fault when the test, and only the test, executes. In this case, global triggers are inappropriate since another program might go down the path on the right before the test starts, causing the fault point to be triggered prematurely.

Environment Trigger

Global triggers may be unsuitable for triggering fault points in code paths commonly traversed by a large number of events or by events which occur regularly in short periods of time. Environment triggers can be used in this case since they allow fault points to be triggered only during a specific invocation.

As the name suggests, environment triggers are stored in the environment of an invocation. Since a client must supply an environment-type variable each time it invokes an object, environment triggers carried by the variable are isolated to within that invocation only. Fault points along the path of the invocation will not be triggered by other clients invoking the same (or other) objects since each client uses its own copy of environment variable (unless, of course, two clients set triggers for the same fault point).

On the client side of an invocation, triggers stored in the environment are marshaled and sent to the object's server. On the server side, they are unmarshaled and stored in the server's own environment. This allows both client and server to "see" the same triggers. Since on the server side each invocation is performed in a separate execution thread and each thread has a separate environment, environment triggers of one invocation are isolated from other invocations.

Figure 7:
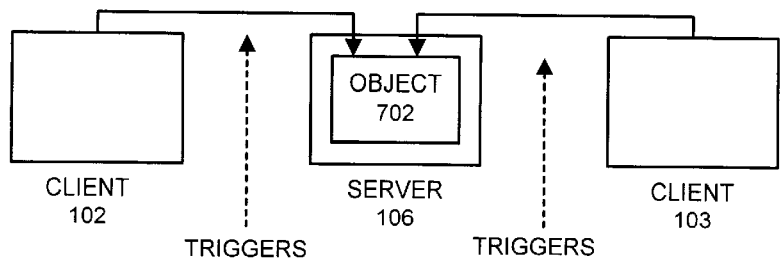
FIG. 7 illustrates the use of an environment trigger in accordance with an embodiment of the present invention.
Figure 8:
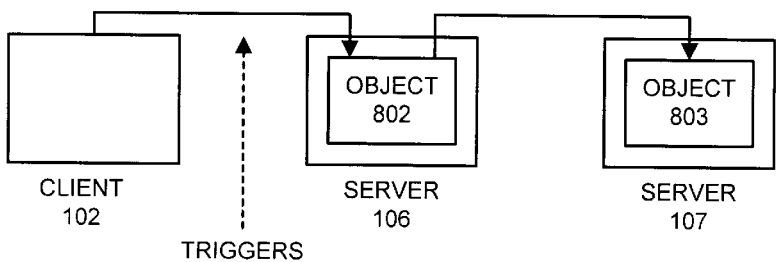
FIG. 8 illustrates the use of an environment trigger in a nested invocation in accordance with an embodiment of the present invention.
Figure 9:
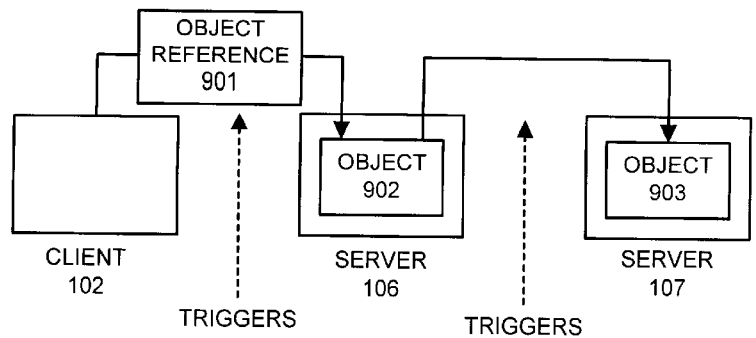
FIG. 9 illustrates the use of an object reference trigger in accordance with an embodiment of the present invention.

An example of invocation scenarios for which environment triggers are suited appears in FIG. 7. Both client 102 and client 103 invoke the same object 702 on server 106, but only client 102 sets triggers in its environment. On server 106, fault points are triggered only when object 702 is invoked by client 102, although both invocations follow the same code path.

Environment triggers are particularly useful for nested-invocation scenarios and we want to trigger fault points along all invocations in the scenario. For example, in FIG. 8 client 102 sets some triggers in its environment and then invokes object 802 in server 106, which in turn invokes object 803 in server 107. Since environment triggers are transmitted across both invocations, fault points along both invocation paths can be triggered.

Note that in one embodiment of the present invention, where environments are local variables, this is only possible if object 802 uses the same environment variable when invoking object 803 as when it is invoked by client 102.

However, there is a limit to what environment triggers can do in nested-invocation scenarios. Using the scenario above, let's suppose we want to trigger fault points only along either the invocation from client 102 to object 802 or the invocation from object 802 to object 803 but not both. Environment triggers (or global triggers) can not be used in this situation since both invocations "see" the same triggers.

Trigger types discussed in the next subsections can be used to solve this problem. Table 5 provides an example of how environment triggers can be set and cleared.

Object Reference Trigger

Object reference triggers are similar to environment triggers. However, instead of the environment, object references "carry" object reference triggers. These triggers are extremely useful for scenarios in which object references are passed as invocation call arguments or as returned values of an invocation call. An example of how test clients can set object reference triggers appears in Table 6.

TABLE 5

```
void test(TestObj_ptr objref)
{
    Environment   env;
    longlong      fault_arg673[3] = {5, -3, 225};
    char          fault_arg11 = 'c';
    ...
    // Set triggers for fault points 673 and 11.
    env.fi( ).add(673, fault_arg673, sizeof(fault_arg673));
    env.fi( ).add(11, &fault_arg11, sizeof(fault_arg11));
    // Now invoke method foo( ) of the object given in the argument
    objref->foo(env);
    if (env.sys_exception( )) {
        fprintf(stderr, "FAIL: %s\n",
            env.sys_exception( ).print( ));
        return;
    }
    // Clear all triggers in env
    env.fi( ).clear_all( );
    ...
}
```

On the server implementation, the fault points can be implemented as illustrated in Table 7.

Object reference triggers are useful for isolating faults to within a subset of invocations in nested-invocation scenarios. For example in FIG. 9, suppose we have a scenario where object 902 includes a method that takes a reference to another object as an input parameter.

By setting triggers in object reference 901 prior to passing it to object 902, client 102 can trigger fault points only along the path between client 102 and object 902. Those along the path between object 902 and object 903 won't be triggered. Compare this to the case where client 102 set the triggers in the environment.

TABLE 6

```
// Client will invoke Obj1.method( ) which accepts a reference to
// Obj2 as an 'in' parameter.
void client( )
{
    Obj1_ptr    obj1ref;
    Obj2_ptr    obj2ref;
    int         fault_arg223 = 5; // 5-second delay for fault 223
    Environment e;
    // Get references from the name server.
    obj1ref = get from name server;
    obj2ref = get from name server;
    // Set trigger for faults 223 and 555 in objref2
    obj2ref->fi( ).add(223, &fault_arg223, sizeof(int));
    obj2ref->fi( ).add(555, NULL, 0); // no argument for fault 555
    // Now invoke Obj1.method( ) (note obj2ref is passed
    // as argument)
    obj1ref->method(obj2ref, e);
    ...
    // Clear trigger 223 and add trigger for fault 96532.
    obj2ref->fi( ).clear(223);
    obj2ref->fi( ).add(96532, NULL, 0);
    // Invoke Obj1.method( ) again but with faults 555 and
    // 96532 this time
    obj1ref->method(obj2ref, e);
    ...
    // Clear all triggers in obj2ref.
    obj2ref->fi( ).clear_all( );
    ...
}
```

Figure 10:
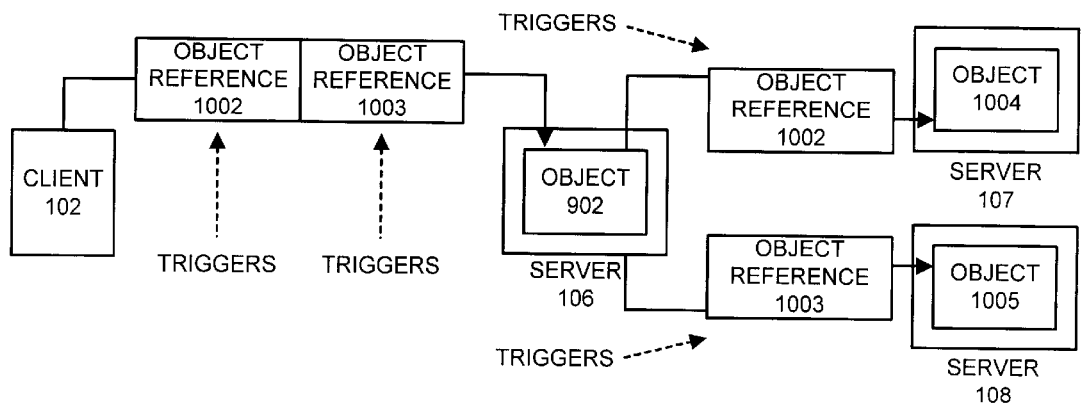
FIG. 10 illustrates the use of an object reference trigger in a distributed services scenario in accordance with an embodiment of the present invention.

An interesting invocation scenario for which this method can be useful is the "distribution service" scenario, in which an object takes a sequence of object references and distributes each reference in the sequence to other objects (see FIG. 10).

TABLE 7

```
void Obj1_impl::method(Obj2_ptr obj2ref, Environment& env)
{
    ...
    #ifdef_FAULT_INJECTION
        // Fault 555 can only be triggered from obj2ref
        FAULT_POINT(555, obj2ref, NULL do_fault555);
    #endif
    ...
    #ifdef_FAULT_INJECTION
        // Can be triggered from either obj2ref or the Environment
        FAULT_POINT(223, obj2ref, &env, do_delay);
    #endif
    ...
    #ifdef_FAULT_INJECTION
        // Cause panic only if trigger is set in obj2ref,
        // but not Environment.
        FAULT_POINT(96532, obj2ref, NULL, do_panic);
    #endif
    ...
}
```

In this example, object 902 takes a sequence two object references. Object 902 then invokes object 1004, passing in the first object reference 1002 in the sequence, and object 1005, passing in the second object reference 1003 in the sequence. To trigger different fault points along the path between object 902 and object 1004 and the path between object 902 and object 1005, client 102 can set different triggers in object reference 1002 and object reference 1003 prior to passing them to object 902.

Compare this with the situation where client 102 sets all the triggers in the environment. In this case, fault points along all three invocation paths are triggered.

Invocation Trigger

As described in the previous subsection, an object reference can carry with it object reference triggers. These triggers are called "invocation triggers" when they are used to generate faults when the referenced object is invoked. This brings up two implications. First, a client can set triggers on an object reference prior to invoking a method on the object. These triggers are isolated only within that invocation. Second, a client can pass an object reference carrying object reference triggers to another object. Faults can then be generated when the receiver object invokes the referenced object.

Figure 11:
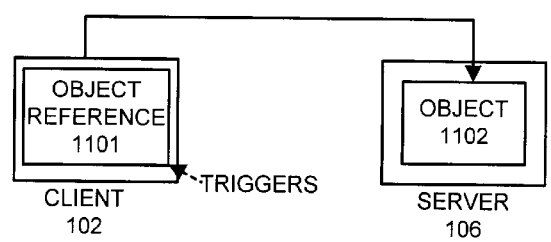
FIG. 11 illustrates the use of an invocation trigger in accordance with an embodiment of the present invention.

In the simplest scenario in which a client 102 invokes a server's object 1102 and no nested invocations is involved (single-invocation scenario), invocation triggers are very similar to environment triggers—although conceptually it is probably easier to understand (see FIG. 11).

That is, triggers are specific only to that particular invocation, except the triggers are set in the object reference instead of the environment. Table 8 provides an example how this can be done.

Since object references can be passed around as invocation arguments, there are many interesting scenarios for which invocation triggers can be used to generate faults. Three of which are presented below.

Figure 12:
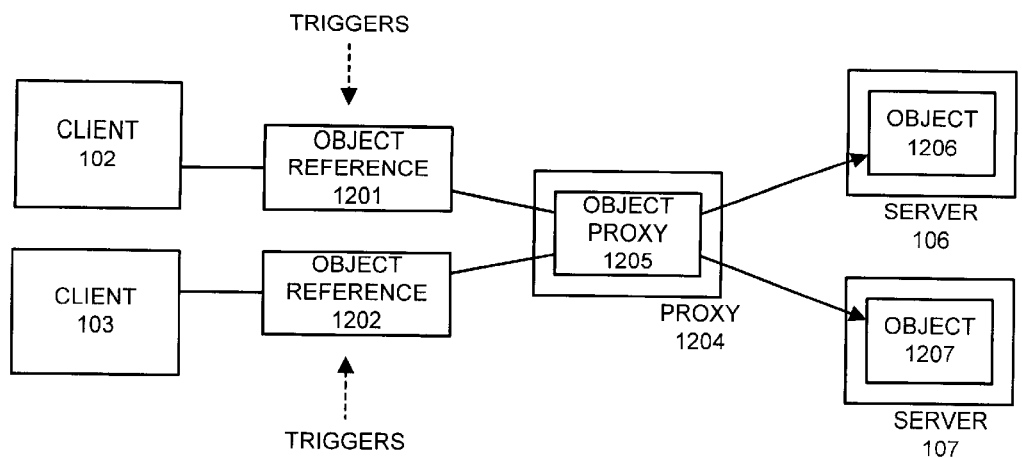
FIG. 12 illustrates the use of an invocation trigger in a proxy server scenario in accordance with an embodiment of the present invention.

The first is called the "proxy server" scenario, in which a client 102 passes an object reference 1201 to a server object 1205 which then performs an invocation call to the referenced object on behalf of the client 102 (see FIG. 12).

TABLE 8

```
void
client( )
{
    Obj_ptr       objref;
    Environment   env;
    char          fault_arg111 = 'x';
    // Get reference to Obj from the name server
    objref = get reference from name server
    // Set triggers for the invocation.
    objref->fi( ).add(111, fault_arg111, sizeof(fault_arg111));
    objref->fi( ).add(12345, NULL, 0); // no arg for fault 12345
    // Now invoke Obj's first method
    objref->method1(env);
    env.clear( );
    // Clear all triggers and set fault 999
    objref->fi( ).clear_all( )
    objref->fi( ).add(999, NULL, 0);
    // Invoke Obj's second method
    objref->method2(env);
    // Done with the reference
    CORBA::release(objref);
}
```

Client 102 invokes object proxy 1205 giving it a reference to object 1206. In turn, object proxy 1205 invokes object 1206 on behalf of client 102. Similarly, client 103 invokes object proxy 1205 with a reference to object 1207, which will be invoked by object proxy 1205 on its behalf. To trigger fault points along the invocation path between object proxy 1205 and object 1206, client 102 can set triggers inside object reference 1201 prior to invoking object proxy 1205. Similarly, client 103 can set triggers inside object reference 1202 to trigger fault points along the path between object proxy 1205 and object 1207.

Figure 13:
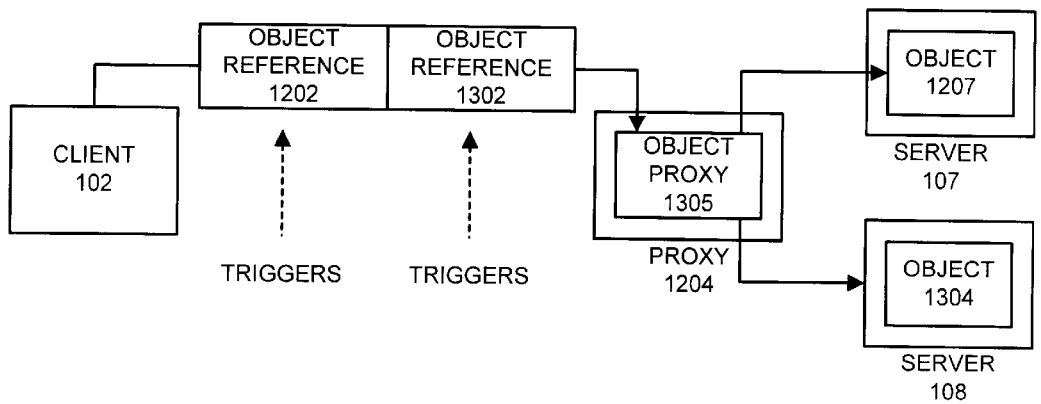
FIG. 13 illustrates another use of an invocation trigger in a proxy server scenario in accordance with an embodiment of the present invention.
Figure 14:
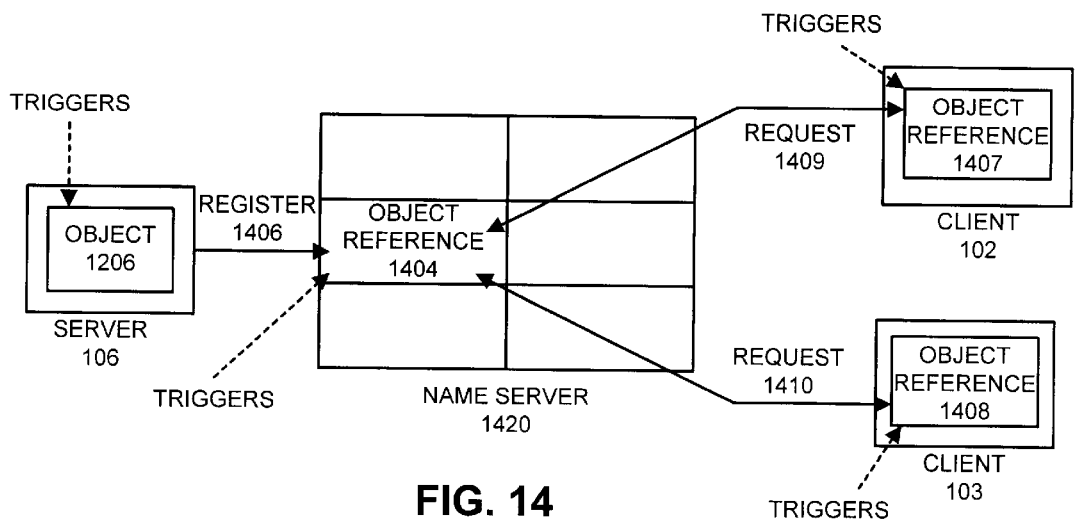
FIG. 14 illustrates a technique for passing triggers around in accordance with an embodiment of the present invention.

The second scenario is similar to the first, except that client 102 passes in a sequence of object references to the "proxy" object, which, in turn invokes, either iteratively or in parallel, the objects referenced by the passed references (see FIG. 13).

To induce different faults along the object proxy 1305 to object 1207 path and the object proxy 1305 to object 1304 path, client 102 can set separate triggers for object reference 1202 and object reference 1302 prior to invoking the proxy.

The third scenario actually is not an invocation scenario, but more of a technique for passing triggers around. It can be called the "virus" technique because it gives the ability to "spread" triggers around to all clients of an object.

Normally, when they are created, objects register themselves to the name server 1420 using string names. That is, the object obtains a reference to itself and passes it to the name server 1420, which will keep it in its table of object references. Any client 102 wanting a reference to the object can make a request to the name server 1420 using the registered string name. Name server 1420 returns a duplicate of the requested reference to the client (see FIG. 14).

To spread triggers to all of its clients, the object can first set some object reference triggers in its object reference prior to passing it to name server 1420. When clients obtain duplicates of the reference from name server 1420, they also obtain a copy of those triggers. These triggers become invocation triggers when these references are used to invoke the object.

There is no single trigger type which satisfies all testing needs. The choice of what type of triggers to use will depend on what is being tested, its invocation behavior, how the test is implemented, and the types and locations of fault points to be triggered. For some cases, it might be sufficient to use just one trigger type; while for others it might be necessary to use more than one trigger type at once.

The foregoing descriptions of embodiments of the invention have been presented for purposes of illustration and description only. They are not intended to be exhaustive or to limit the-present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing a computer system by using software to inject faults into the computer system while the computer system is operating, comprising:

including a fault point into source code for a program, wherein the fault point causes a fault to occur if a trigger associated with the fault point is set and if an execution path of the program passes through the fault point, and wherein the trigger is stored within an object reference;

compiling the source code into executable code;

setting the trigger for the fault point, so that the fault occurs if the execution path of the program passes through the fault point; and executing the executable code for the program.

2. The method of claim 1, wherein if the fault point is encountered while executing the executable code for the program, executing the fault point involves:

looking up a trigger associated with the fault point;

determining whether the trigger has been set; and executing code associated with the fault point if the trigger has been set.

3. The method of claim 1, wherein the fault point calls a fault function that causes the fault to occur.

4. The method of claim 1, wherein the fault point includes code that causes the fault to occur.

5. The method of claim 1, wherein the trigger causes the fault to be generated when the referenced object is invoked.

6. The method of claim 1, wherein the fault includes one of:
   a computer system reboot operation;
   a computer system panic operation;
   a return of an error code;
   a forced change in control flow;
   a resource allocation failure;
   a response delay; and
   a deadlock.

7. A computer-readable storage medium storing instructions that when executed by a computer cause the computer to perform a method for testing a computer system by using software to inject faults into the computer system while the computer system is operating, the method comprising:
   including a fault point into source code for a program, wherein the fault point causes a fault to occur if a trigger associated with the fault point is set and if an execution path of the program passes through the fault point, and wherein the trigger is stored within an object reference;
   compiling the source code into executable code;
   setting the trigger for the fault point, so that the fault occurs if the execution path of the program passes through the fault point; and
   executing the executable code for the program.

8. The computer-readable storage medium of claim 7, wherein if the fault point is encountered while executing the executable code for the program, executing the fault point involves:
   looking up a trigger associated with the fault point;
   determining whether the trigger has been set; and
   executing code associated with the fault point if the trigger has been set.

9. The computer-readable storage medium of claim 7, wherein the fault point calls a fault function that causes the fault to occur.

10. The computer-readable storage medium of claim 7, wherein the fault point includes code that causes the fault to occur.

11. The computer-readable storage medium of claim 7, wherein the trigger causes the fault to be generated when the referenced object is invoked.

12. The computer-readable storage medium of claim 7, wherein the fault includes one of:
    a computer system reboot operation;
    a computer system panic operation;
    a return of an error code;
    a forced change in control flow;
    a resource allocation failure;
    a response delay; and
    a deadlock.

13. An apparatus that facilitates testing a computer system by using software to inject faults into the computer system while the computer system is operating, the apparatus comprising:
    a fault point inclusion mechanism that facilitates including a fault point into source code for a program, wherein the fault point causes a fault to occur if a trigger associated with the fault point is set and if an execution path of the program passes through the fault point, and wherein the trigger is stored within an object reference;
    a compiler for compiling the source code into executable code, so that source code for the fault point is compiled into corresponding executable code for the fault point; and
    a trigger setting mechanism that facilitates setting the trigger for the fault point, so that the fault occurs if the execution path of the program passes through the fault point.

14. The apparatus of claim 13, wherein the fault point is configured so that executing the executable code for the fault point involves:
    looking up a trigger associated with the fault point;
    determining whether the trigger has been set; and
    executing code associated with the fault point if the trigger has been set.

15. The apparatus of claim 13, wherein the fault point calls a fault function that causes the fault to occur.

16. The apparatus of claim 13, wherein the fault point includes code that causes the fault to occur.

17. The apparatus of claim 13, wherein the trigger causes the fault to be generated when the referenced object is invoked.

18. The apparatus of claim 13, wherein the fault includes one of:
    a computer system reboot operation;
    a computer system panic operation;
    a return of an error code;
    a forced change in control flow;
    a resource allocation failure;
    a response delay; and
    a deadlock.

19. A method for testing a computer system by using software to inject faults into the computer system while the computer system is operating, comprising:
    including a fault point into source code for a program, wherein the fault point causes a fault to occur if a trigger associated with the fault point is set and if an execution path of the program passes through the fault point, and wherein the trigger has global scope and is stored in a kernel address space of an operating system within the computer system;
    compiling the source code into executable code;
    setting the trigger for the fault point, so that the fault occurs if the execution path of the program passes through the fault point; and
    executing the executable code for the program.

20. A computer-readable storage medium storing instructions that when executed by a computer cause the computer to perform a method for testing a computer system by using software to inject faults into the computer system while the computer system is operating, the method comprising:
    including a fault point into source code for a program, wherein the fault point causes a fault to occur if a trigger associated with the fault point is set and if an execution path of the program passes through the fault point, and wherein the trigger has global scope and is stored in a kernel address space of an operating system within the computer system;
    compiling the source code into executable code;

setting the trigger for the fault point, so that the fault occurs if the execution path of the program passes through the fault point; and executing the executable code for the program.

21. An apparatus that facilitates testing a computer system by using software to inject faults into the computer system while the computer system is operating, the apparatus comprising:

a fault point inclusion mechanism that facilitates including a fault point into source code for a program, wherein the fault point causes a fault to occur if a trigger associated with the fault point is set and if an execution path of the program passes through the fault point, and wherein the trigger has global scope and is stored in a kernel address space of an operating system within the computer system;

a compiler for compiling the source code into executable code so that source code for the fault point is compiled into corresponding executable code for the fault point; and a trigger setting mechanism that facilitates setting the trigger for the fault point, so that the fault occurs if the execution path of the program passes through the fault point.

* * * * *